Aug. 5, 1947.  S. G. BART  2,425,022
REFLECTOR AND METHOD FOR FORMING SAME
Filed Nov. 18, 1943
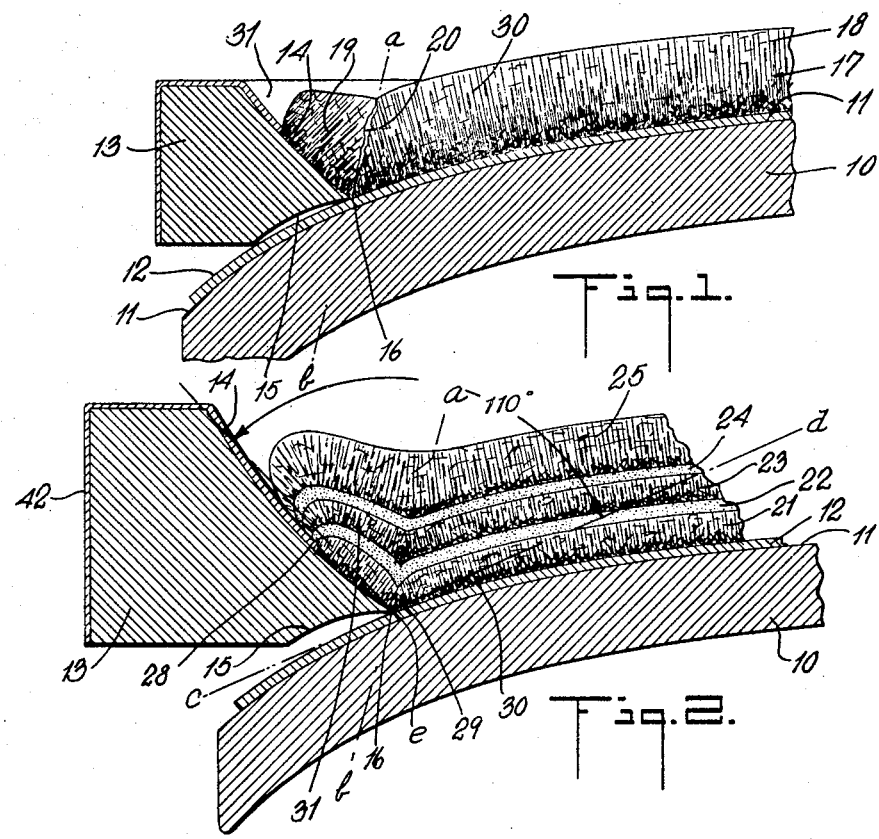
Fig. 1.
Fig. 2.
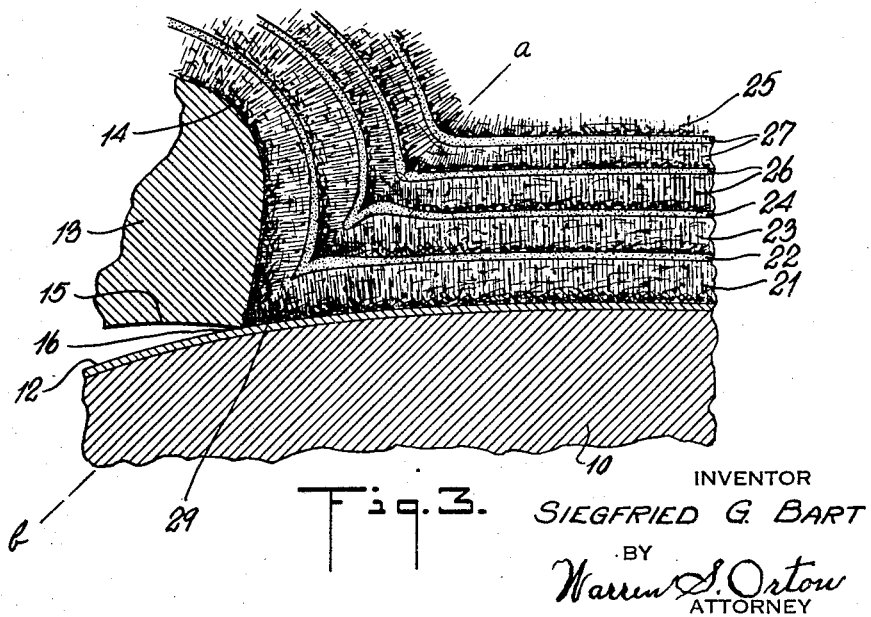
Fig. 3.
INVENTOR
SIEGFRIED G. BART
BY
Warren S. Orton
ATTORNEY Patented Aug. 5, 1947

2,425,022

UNITED STATES PATENT OFFICE 2,425,022

REFLECTOR AND METHOD FOR FORMING SAME

Siegfried G. Bart, Essex Fells, N. J.

Application November 18, 1943, Serial No. 510,767

4 Claims. (Cl. 88—105)

The invention relates in general to an improved method for reinforcing multi-layered articles formed of electrolytically deposited thin sheets of metals; and to the resulting articles produced thereby. The invention relates specifically to a method of forming a reinforced reflector, one form of such reflector with a reinforcing ring at its outer edge electrolytically welded to the body of the reflector is disclosed by Bart Patent 1,503,743, and a reinforcing ring of slightly different form from that shown in the patent is disclosed in the explanatory Fig. 1 of this application.

A disadvantage inherent in these reinforced reflectors, and similar disk-like articles, as heretofore constructed, is that the reinforcing ring will break away from the balance of the reflector unless formed under ideal conditions. This breaking away of the ring with jagged portions of the metal adhering thereto is very apt to occur after the reflector has been in use for some time. As these reflectors are expensive to manufacture, being sometimes as much as six feet in diameter, such breakage has become economically prohibitive.

The primary object of the invention is to provide an improved technique for electrolytically welding the ring or other preformed reinforcement to the balance of the reflector, or other disc-like body, in such way that the reinforcement is permanently secured to the electrolytically deposited layers even under conditions where such articles are subjected to intense vibration and even shock while in use.

The invention also relates to a ring of novel design which functions during the initial steps of forming the multilayered body as part of the mold apparatus and which functions in the completed article as a reinforcing band or rim electrolytically welded to the metallic body reinforced thereby.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method hereinafter set forth and claimed.

The invention will be described in connection with the accompanying drawing in which:

Fig. 1 is a radial transverse sectional view of one edge of a mold apparatus for forming a reflector illustrating a known structure of apparatus and reinforcing ring, with one layer of metal and over which disclosure the present invention herein featured constitutes an improvement;

Fig. 2 is a view similar to the showing in Fig. 1 in so far as the mold and ring are concerned, but showing a new form of multi-layered reflector designed to avoid the faults of the basic or initial layer of metal shown in Fig. 1; and Fig. 3 is a reproduction of a photographic section of a portion of the showing in Fig. 2 at the joint of the ring and mold, magnified about one hundred times.

It is understood that in the several views, the thickness of the layers are greatly exaggerated in order to show them and are not even in their correct proportions relative to the mold elements.

Referring first to the showing in Fig. 1 in order to explain known practices, it will be understood that reflectors and like objects are formed on a smooth glass or metal mold 10, in the instant case shown to be of parabolic form in cross-section. On the deposit receiving surface 11 of the mold is laid a thin layer, or rather, film 12 of conducting material, such as silver, copper, etc. deposited by well known methods forming no part of this disclosure. It is a known practice to remove the silver film 12 after the reflector has otherwise been completed and substitute therefor a layer of rhodium or other highly reflective metal to form the reflective surface of the finished reflector. Located on the layer 12 is an annular reinforcing ring 13 of metal, wood, plastic or other suitable composition and in this case shown to be somewhat triangular in cross-section with its inner peripheral face 14 being straight or convex as shown, and meeting the concaved bottom 15 to form a knife edge 16 directed inwardly towards the center of the ring.

It is a usual practice to place this assembly of mold apparatus into an electrolytic tank and deposit thereon one or more layers of metal, usually copper, and sometimes copper reinforced with a backing layer of nickel, to give the reflector additional strength in the portion thereof outlined by the ring. It has been found that the basic layer 17 of copper so deposited on the silver film 12 discloses, when highly magnified, a crystalline structure and that these crystals gradually become more pronounced as the deposit thickens and build up more or less in long thin lines perpendicular to the surface on which they are deposited. As the layer of deposited copper becomes thicker, it gradually loses its initial dense, fine grain structure and develops a coarser crystalline columnar structure eventually developing a broken, knobby construction commonly known as "trees."

In the showing in Fig. 1 an attempt has been made in so far as the basic layer 17 of copper is concerned, to show the arrangement of the crystals as taken from a highly magnified photograph which shows crystals 18 extending from the mold 10 and perpendicular of the tangent to its curve and crystals 19 perpendicularly extending from the face 14 of the ring. It is particularly noted that there is a high angle about 90° between the mold and peripheral 14 of the ring in all radial cross-sections, one of which is shown in Fig. 1. Between these two sets of crystals and roughly along lines which form the bisector $a$—$b$ of the angle formed between the surfaces 14 and 12 is formed a fault or weakened line of cleavage 20 which, highly magnified, shows an actual break or crevice. It is along this line that the reflectors break after they have been in use as above indicated, and therefore the primary object of this invention is to provide a method for forming a reflector which will not possess this fault and which, therefore, will produce a reflector in which the ring, like the ring 13, is permanently welded to the balance of the structure.

Broadly, I attain this object by interrupting the initial metal depositing step, which as above noted is usually of copper, while quite thin and thus before there is any possibility of the coarse crystals or "trees" being formed as above indicated. There is then deposited on the initial layer 12 a layer of a metal having greater throwing power in the electrolytic bath, and, preferably, a metal having finer grain and more dense structure than that of the initial layer. This method of depositing layers of successively cross grain and fine grain metal is continued until the desired thickness and thus strength of multilayered metal is obtained.

Referring to the disclosure in Fig. 2, the initial layer 21 is of electrolytically deposited acid copper formed with a current density of about 20 amperes per square foot and in the illustrated instance having a thickness of about seven thousandths of an inch. Similarly deposited on the copper is the succeeding layer 22, in this instance shown to be nickel deposited with a current density of about 25 to 30 amperes per square foot and having a thickness of about five ten thousandths of an inch. This operation is repeated to form a third layer 23 of copper on which is deposited a fourth layer 24 of nickel, and, finally, a relatively thick outside or backing layer 25 of copper.

In the highly magnified showing in Fig. 3 an additional pair of copper and nickel layers, marked respectively 26 and 27, is added between the layers 24 and 25, omitted in the Fig. 2 disclosure to save repetition of details. The layer of nickel, such as layer 22, laid on each layer of copper therebelow acts in effect to stop the growth of the coarse crystals and "trees," so that the succeeding copper layer, such as is shown at 23, starts initially as did the layer 21 with the finely precipitated grains, and again the deposition of this layer 23 is interrupted at the point where, if continued, the fault 20 would begin to form. It is seen that the basic copper layer 21 overlaps the joint formed by the knife edge 16 at the inner perimeter 14 of the ring and the silver film 12 on the mold; that the next nickel layer 22 covers all of the copper layer 21, and overlaps the joint 28 formed between the edge of the copper layer 21 and the adjacent portion of the face 14 of the reinforcing ring.

It is preferable to form the completed body portion of the reflector mainly of copper with relatively thick layers of copper and relatively thin layers of the nickel therebetween. While nickel has been suggested as the metal preferable for the instant situation, it is within the scope of the disclosure to substitute for the nickel, palladium, one of the platinum metals, gold or silver, and, under some conditions, even iron has been used. In place of the copper, nickel or iron may be used.

It has been known, as disclosed in the patent to Rose, 1,397,785, November 22, 1921, in forming printing plates to deposit on an engraved plate alternate layers of thin nickel and thicker copper, first with a layer of nickel to thickness of .001 inch and then a layer of copper about four and one-half times thicker or .0045 inch.

While there is used, in the preferred method herein disclosed, alternate layers of copper and nickel, the copper is deposited first so as to make the angled part, where the fault usually starts, of copper and with a thickness about thirty-five times that of the thin succeeding layer of nickel thereon. As above noted, the object here is to interrupt the formation of the bisecting fault 20 even before it has had an opportunity to make any start which might later facilitate a breaking off of the ring from the balance of the reflector. Even as viewed with a powerful microscope, no fault is visible in the angled part 29 of the layer 21, that is, in the region of the bisector $a$—$b$ where the fault usually starts as shown in Fig. 1. Even if minute faults may start within any one of the copper layers, any such fault would be interrupted at the next nickel layer or layers and its continuity limited to the layer in which it originated.

In the showings in Figs. 1 and 2, the included angle formed between the inner perimeter 14 of the ring 13 and the tangent $c$—$d$ to the curve of the glass mold at the juncture $e$ has heretofore been formed of about 90 degrees or, perhaps, a little more. This means, of course, that the portion 30 of the copper layer facing the mold 10 formed a sharp angle, in the case of Fig. 2 about 110 degrees with the outstanding portion 31 facing the ring. It has been found that the sharper the angle the greater is the possibility of the fault 20 being formed along the line more or less bisecting the angle. On the contrary, it has been found that even in the case of the showing of a relatively thick layer of copper in Fig. 1, the possibility of a fault developing minimizes with increase in the angle at which the deposited layer or layers meet the inner perimeter of the ring.

While there have been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. In the art of forming a reflector having a multiple layered body portion outlined by an annular reinforcing ring whose inner face forms an angle of about 110 degrees with the reflective surface of the body portion and which body portion is electrolytically welded at its perimeter to said inner face, the method which consists in laying the ring on a mold surface, subjecting the assembly thus formed to the action of an electrolytic bath containing copper and depositing a thin layer of copper across the portion of the mold outlined by the ring, and across at least a portion of the inner face of the ring, continuing the operation until a copper layer of about 0.007 inch in thickness is formed, subjecting the assembly with its initial copper layer to the action of an electrolytic bath containing nickel and depositing a thin layer of nickel electrolytically welded to the initial copper layer and continuing the operation until a nickel layer about 0.0005 inch is formed, and repeating these two metallic depositing operations alternatingly depositing thin layers of copper and nickel until the desired thickness of material is formed on the body portion.

2. A reflector comprising a preformed annular outlining reinforcing ring and a body portion formed mostly of copper and formed of alternate extremely thin layers of electrolytically deposited copper and nickel, said body portion fitted within the ring and electrolytically welded at its perimeter to the inner face of the ring, one side of the body portion forming a reflective surface, the inner face of the ring forming a high angle of about 110 degrees with said surface, the layer forming the reflective surface being of fine grain copper sufficiently thin to avoid the formation therein of any coarse crystals or "trees," with its central portion extending across the opening of the ring and outlined by an angled part conforming to and electrolytically welded to the high angled inner face of the ring and thus extending at an angle of about 110 degrees to its central portion, the next adjacent layer being of nickel having a thickness of about one fifteenth of that of the copper, likewise having a central portion outlined by an angled part and conforming to and electrolytically welded respectively to the central portion and to the angled part of the said copper layer, and the balance of said body portion formed of at least one additional pair of such nickel and copper layers similarly conforming to and welded electrolytically to the preceding pair of copper-nickel layers.

3. A reflector comprising a preformed annular outlining reinforcing ring and a body portion formed of alternate layers of electrolytically deposited copper and nickel, said body portion fitted within the ring and electrolytically welded thereto, one side of the body portion forming a reflective surface, the inner face of the ring forming a high angle of about 110 degrees with said surface, the layer forming the reflective surface being of copper, having a thickness of about 0.007 inch, with its central portion extending across the opening of the ring and outlined by an angled part conforming to and electrolytically welded to the high angled inner face of the ring and extending at an angle of about 110 degrees to its central portion, the next adjacent layer being of nickel having a thickness of about 0.0005 inch, likewise having a central portion outlined by an angled part conforming to and electrolytically welded respectively to the central portion and to the angled part of the copper layer, and the balance of said body portion formed of at least one additional pair of such nickel and copper layers similarly conforming to and welded electrolytically to the preceding pair of copper-nickel layers.

4. The device defined in claim 2 and in which the angle formed between each central portion and its outlining angled part is sharpest in the first named copper layer and becomes progressively less sharp and more rounded in each succeeding layer considered in a direction away from said reflective surface.

SIEGFRIED G. BART.

REFERENCES CITED

The following references are of record in the file of this patent:

UNITED STATES PATENTS

| Number | Name | Date |
| --- | --- | --- |
| 1,304,844 | Barnes | May 27, 1919 |
| 1,394,085 | Halvorson | Oct. 18, 1921 |
| 1,397,785 | Rose | Nov. 22, 1921 |
| 1,560,032 | Bart | Nov. 3, 1925 |
| 1,977,639 | Langdon | Oct. 23, 1934 |
| 2,135,873 | Jones et al. | Nov. 8, 1938 |
| 1,872,221 | Bart | Aug. 16, 1932 |